United States Patent

Katz et al.

Patent Number: 5,195,838
Date of Patent: Mar. 23, 1993

[54] HYDRAULICALLY SECURABLE AND ANGULARLY ADJUSTABLE GEARS

[76] Inventors: Sidney Katz, 6 Hedgerow La., Spring Valley, N.Y. 10977; Jose O. Gutierez, 184 - 14th St., Wood-Ridge, N.J. 07075; Joseph Klucsarics, 279 Liberty St. #30, Little Ferry, N.J. 07643

[21] Appl. No.: 780,404

[22] Filed: Oct. 17, 1991

Related U.S. Application Data

[63] Continuation of Ser. No. 510,041, Apr. 17, 1990, abandoned.

[51] Int. Cl.⁵ .............................................. F16B 2/04
[52] U.S. Cl. ........................... 403/5; 29/113.1; 29/115; 100/170; 101/375; 74/401
[58] Field of Search ................... 403/5, 36, 15, 37, 34, 403/31; 101/375; 29/113.1, 113.2, 115; 409/905; 74/401, 402; 285/36; 100/170

[56] References Cited

U.S. PATENT DOCUMENTS

| | | | |
|---|---|---|---|
| 3,486,776 | 12/1969 | Le Baron | 403/5 |
| 3,917,422 | 11/1975 | Betzler | 403/15 |
| 4,264,229 | 4/1981 | Falk et al. | 403/5 |
| 4,381,709 | 5/1983 | Katz | 29/113.1 |
| 4,383,483 | 5/1983 | Moss | 29/113.1 |
| 4,624,184 | 11/1986 | Katz et al. | 101/375 |
| 4,651,643 | 3/1987 | Katz | 101/375 |
| 4,669,999 | 6/1987 | Miller | 403/2 |
| 4,705,421 | 11/1987 | Depping | 403/5 |
| 4,794,858 | 1/1989 | Katz | 101/375 |

FOREIGN PATENT DOCUMENTS

| | | | |
|---|---|---|---|
| 2659547 | 7/1978 | Fed. Rep. of Germany | 403/5 |
| 2721337 | 11/1978 | Fed. Rep. of Germany | 403/31 |
| 62-639 | 3/1986 | Japan | 29/115 |
| 893426 | 4/1962 | United Kingdom | 29/113.2 |
| 2188684 | 10/1987 | United Kingdom | 29/115 |

*Primary Examiner*—Eric K. Nicholson
*Attorney, Agent, or Firm*—Abelman, Frayne & Schwab

[57] ABSTRACT

A toothed gear is secured to an associated shaft by an expansive sleeve which is expanded radially inwardly by the pressure of a hydraulic actuator.

7 Claims, 2 Drawing Sheets

HYDRAULICALLY SECURABLE AND ANGULARLY ADJUSTABLE GEARS

This application is a continuation of application Ser. No. 510,041, filed Apr. 17, 1990.

FIELD OF THE INVENTION

This invention relates to gears, particularly ones for use in high precision applications, and ones which find particular utility in high precision rotary printing presses.

In such presses, any angular or radial play or lack of concentricity of the gears relative to the supporting shafts of the printing cylinders will result in a diminution of the accuracy and quality of the printed material, accompanied by misaligned, scuffing, and gear-markings in the finished prints. This is a direct consequence of play and improper meshing of the gear teeth resulting from such lack of concentricity of the gears on their associated shafts, or movement of the gears in angular or radial directions.

BACKGROUND OF THE INVENTION

Gears employed in printing presses commonly are of one of four types. Either they are keyed to the associated shaft, or, they are a shrink fit on the shaft, or, they are pinned to the shaft, or, they are secured to the associated shaft by one or more machine screws extending radially of the gear radially or of an associated hub of the gear.

In printing presses designed for highly accurate printings in more than one printing ink, such as inks differing in color, composition, or other characteristics, the manner in which the gears are secured to their associated shafts is a limiting factor in the extent of accuracy of the produced prints, this in large measure being dictated by the accuracy of centering of the gears on their associated shafts, and the extent to which a gear is prohibited from moving angularly relative to its supporting shaft.

In the event that the gear is keyed to its associated shaft, then, despite the accuracy of machining of the shaft and the bore of the gear, radial movement of the gear out of absolute concentricity with the shaft can occur, as permitted by manufacturing tolerances in the shaft diameter and that of the gear bore. The gear bore must be of slightly larger diameter than that of the associated shaft in order to permit the gear to be fitted onto the shaft, which in turn permits shifting of the gear in directions radially of the shaft axis.

One manner of eliminating this problem is to shrink the gear onto the shaft by heating the gear, fitting the heated gear onto its associated shaft while in a heated condition, and then permitting the gear to col to ambient temperature and become shrink-fitted onto the shaft.

While such a procedure can be employed with great success, it carries with it the disadvantage that the gear must be reheated before it can be removed from the shaft, a procedure that is totally unacceptable in rotary printing presses, in which the gear sets must be replaced for each diameter of printing cylinder to be employed in that press.

Keyed gears are incapable of adjustment of the angular relationship of the gear relative to the angular position of the printing cylinder. However, unwanted limited angular movement of the gear relative to its associated shaft can occur, this being permitted by the manufacturing tolerances of the key and those of the shaft and gear key ways.

Such keyed gear constructions are undesirable in applications that require reversals in the direction of rotation. In conventional keyed constructions angular slippage will occur on each reversal of the direction of rotation, as permitted by the manufacturing tolerances in the key and keyways.

As an alternative to providing a keyed interconnection between the shaft and the gear, a pinned interconnection can be provided. While such a pinned interconnection can successfully eliminate angular play between the gear and its associated shaft, the result is a permanent interconnection between the gear and the shaft, that prohibits ready removal of the gear from the shaft when required in order to perform an exchange of gears, and thus is unacceptable in printing presses.

Pinning of the gear to its associated shaft does not, however, eliminate play in the radial direction of the gear relative to its associated shaft. Any such play can result in improper meshing of the teeth of the gear with those of the adjacent gears in the gear train, with consequential misalignment, gear markings, and scuffing in the produced prints, and can only be overcome by providing spring-loaded split gears.

Gears secured to their associated shaft by machine screws suffer from the same disadvantages, and are in fact encumbered with further and severe disadvantages.

Due to the existing play between the gear bore and the periphery of the shaft, securement of the gear to the shaft by the use of a machine screw, extending radially of the shaft, such as a grub screw, automatically will move the gear out of concentricity with the shaft at the time the machine screw is tightened down. Further, the machine screw must bite into the outer circumference of the shaft, which then becomes pitted and damaged on each exchange of the gear sets. As before, lack of concentricity of the gear relative to its associated shaft will result in gear chatter, and consequential misalignment, gear markings and scuffings in the finished print. Also, on tightening down of the screw, the screw itself can act to shift the angular position of the gear.

The employment of machine screws to fix the gears to their associated shafts does, however, have one major advantage over the keyed gear construction. It permits adjustment of the angular position of the gear relative to the angular position of the associated shaft and the printing cylinder supported by that shaft, i.e., during set up of the press, the gear can be released from its associated shaft and the cylinder rotated into register with the printings of preceding or succeeding printing cylinders, and, the gear then resecured to its associated shaft with the printing cylinder in the required adjusted position of the angular rotation. However, fitting and damage to the shaft caused by the machine screw reduces the accuracy of such an adjustment.

SUMMARY OF THE INVENTION

The present invention seeks to overcome each and every one of the disadvantages of gears that are secured to their associated shaft either by keys or by machine screws, and, to eliminate the disadvantages of heat shrinking or pinning of the gear onto its associated shaft, while at the same time retaining the advantage of the angular adjustability of the gears.

According to the present invention, the gear is formed internally of its axial bore with an expansion diaphragm that is expandable radially inwardly of the bore axis and into frictional gripping contact with the outer periphery of the associated shaft by hydraulic pressure produced by a hydraulic actuator integral with the gear.

In this manner, the problem of lack of concentricity of the gear is eliminated in its entirety, as is the problem of relative angular movement of the gear.

The expansible diaphragm provides the radially inner wall of an annular expansion chamber that is filled with an incompressible fluid, the incompressible fluid being pressurized by any known form of hydraulic actuator, which conveniently is a screw-type hydraulic actuator. The actuator can be integral with the gear, or with a hub or that gear, or, integral with a hub to which the gear is to be pinned and rigidly affixed.

In this manner, of the gear relative to the shaft in either direction or the play the radial and angular direction can be eliminated in its entirety, while at the same time absolute concentricity of the gear with respect to the associated shaft is assured without in any way causing damage to the circumference of the associated shaft, thus exceeding the useful life of the associated shaft.

Further, angular adjustment of the gear relative to its associated shaft can be effected merely by relieving the hydraulic pressure and permitting the gear to slip angularly with respect to its associated shaft, and then reapplying the hydraulic pressure, thus eliminating the disadvantages of keyed or shrink fitted gears.

BRIEF DESCRIPTION OF THE DRAWINGS

Preferred embodiments of the invention will now be described with reference to the accompanying drawings, in which.

DESCRIPTION OF THE PREFERRED EMBODIMENTS

Figure 1:
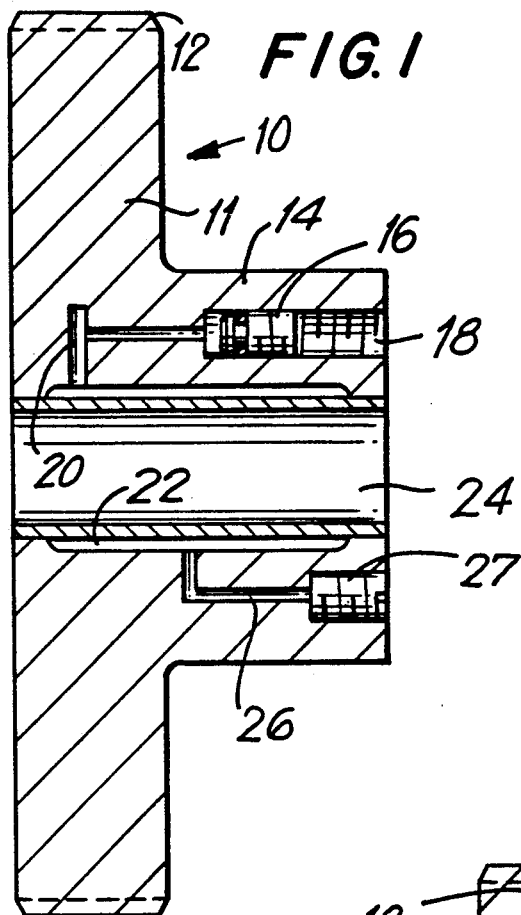
FIG. 1 is a cross-section of a first form of hydraulically secured gear according to the invention.

Referring firstly to FIG. 1, a hydraulically secured gear according to the present invention is indicated generally at 10, the gear being provided by an annular body 11 having a tooth periphery 12. In FIG. 1, the gear 11, 12 is formed integrally with a hub 14, within which is positioned a conventional hydraulic actuator comprised of a threaded plug 16 which is received within a correspondingly bore 18. The output of the hydraulic actuator is connected by conduits 20 to a gallery 22 formed interiorly of the bore of the gear and hub, and, which is of larger diameter than the intended bore diameter of the gear and hub.

Positioned within the bore of the gear and hub in spanning relationship with the gallery 22 is a sleeve 24 providing a hydraulically expansive diaphragm. The sleeve 24 in an unstressed condition has an internal diameter very slightly in excess of the diameter of the shaft onto which the gear 10 is to be fitted, thus permitting the gear to be slid onto the shaft without interference.

Illustrated in FIG. 1 is a conduit 26 which communicates with the gallery 22 and which is normally closed by a threaded plug 27. The purpose of the conduit 26 and the plug 27 is to permit charging of the gallery 22 with an incompressible fluid, such as grease, which is charged into the gallery through the conduit 20, and which purges air contained within the gallery out through the conduit 26. A threaded plug is then inserted in an appropriately threaded bore in the hub to provide a closed hydraulic system.

The sleeve 24 is in the form of an impervious metal tube which is secured in an hermetic sealed manner at its ends to the body 11 and the hub 14, thus completely closing the gallery. Conveniently, this is done by braising or silver soldering the ends of the tube 24 to the lands at the respective opposite ends of the gallery 22.

The tube 24 does not necessarily have to be formed from metal, and, it does not necessarily have to be secured to the body 11 and hub 14 by braising or soldering. The sleeve 24 can be of any material, including plastics material, and can be secured within the body 11 and hub 14 in any convenient manner providing an hermetic seal, for example, by the use of adhesives, provided that it meets the requirement that it provides an hermetic closure for the gallery 22, and, that the sleeve be capable of radially inward deformation on the application of hydraulic pressure to the outer surface thereof, thus to provide a hydraulically deformable diaphragm.

Figure 2:
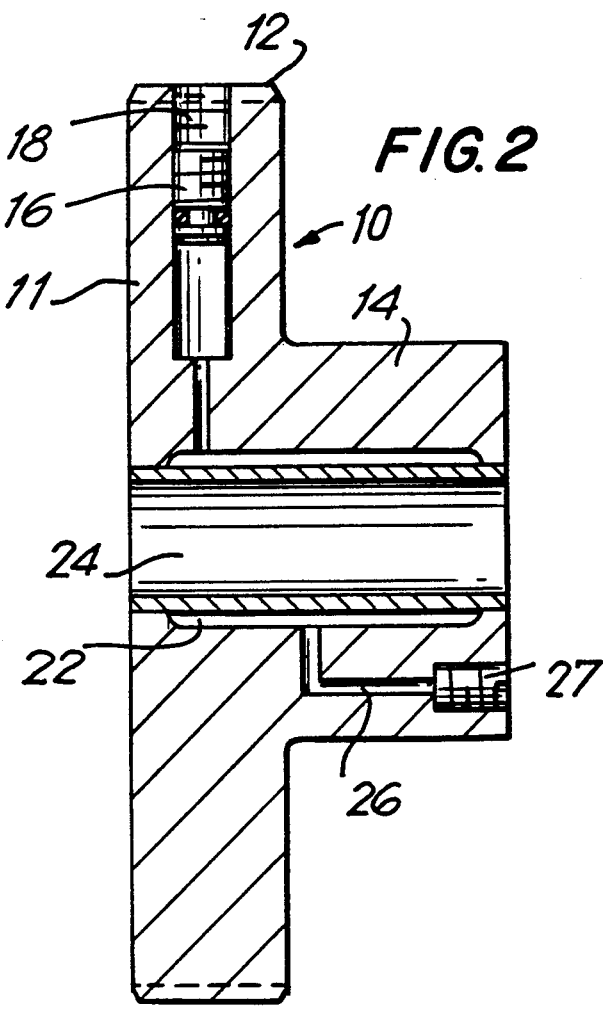
FIG. 2 is a cross-section through another form of hydraulically secured gear according to the present invention.

As is illustrated in FIG. 2, in which the same reference numerals have been used to denote the respective elements of the hydraulically secured gear 10, instead of being positioned extending axially of the hub 14, the hydraulic actuator 16, 18 is positioned in a direction extending radially of the gear body 11. In this manner, the hydraulic actuator can be actuated from the toothed periphery of the gear, which may be convenient in tight locations.

As will be readily appreciated, the bleed passage in FIGS. 1 and 2 does not necessarily need to extend axially through the hub. Instead, it could extend axially through the body 11. Further, if space permits, it could extend radially of the hub 14, without in any way affecting operation of the hydraulic actuator.

Figure 3:
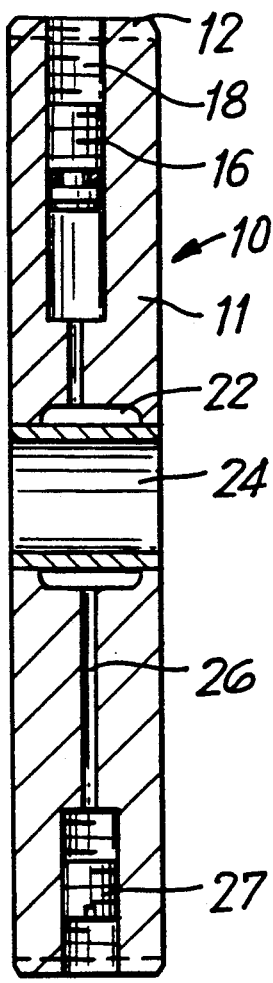
FIG. 3 is a cross-section through an alternative form of the hydraulically secured gear.

In applications requiring an axially short gear, as illustrated in FIG. 3, the hub 14 can be omitted in its entirety, the conduit 26 and its closure plug 27 then being positioned for them to extend radially within the body 11 of the gear.

Figure 4:
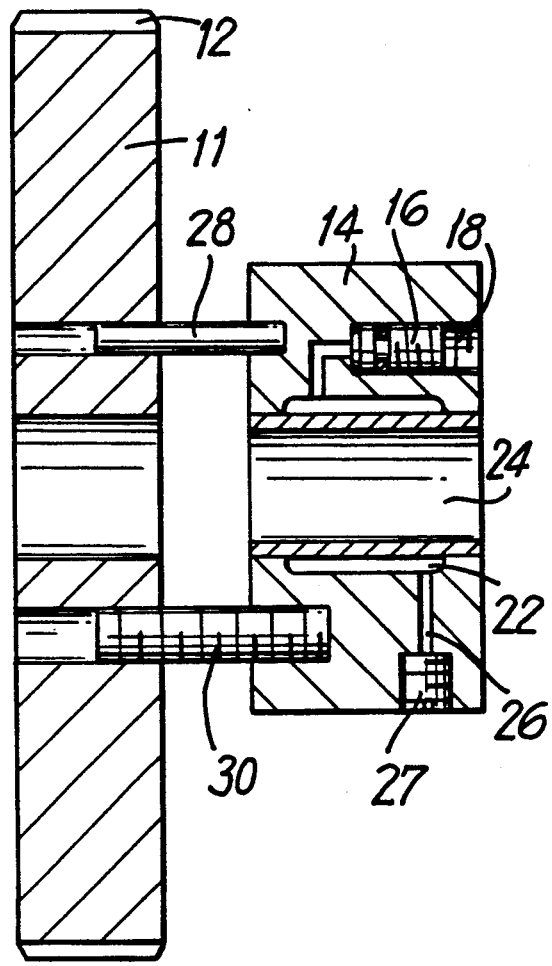
FIG. 4 is a cross-section through an adaptor to which a gear can be attached, the adaptor being hydraulically securable to an associated shaft; and, FIG. 5 is a diagrammatic illustration of an alternative construction of the hydraulically expansible diaphragms 1–of FIGS. 1 through 4.

FIG. 4 illustrates a modification of the invention in which the hub 14 and the associated hydraulic actuator 16, 18, gallery 22 and sleeve 24, together with the bleed passage 26, 27 are formed as a sub-assembly separate from the gear body 11. The hub 14 provided is with axially extending location pins 28 and securing bolts 30, by means of which any selected gear body can be combined with the hub sub-assembly. The hub sub-assembly thus constitutes a universally employable adaptor for connection to a selected gear, or to any other selected annular member, such as a grinding wheel, sanding wheel, circular saw and the like.

Figure 5:
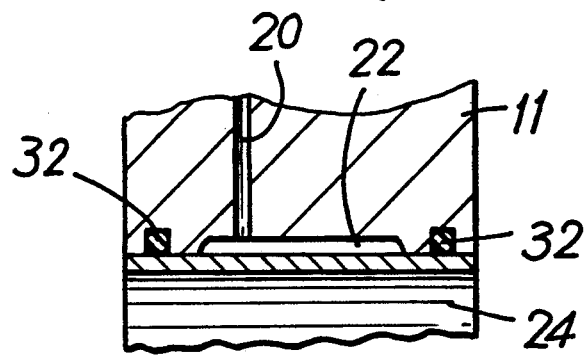

FIG. 5 illustrates an alternative method of securing and hermetically sealing the sleeve 24 within the bore of the gear body 11. In FIG. 5, grooves containing O-rings are provided in the lands at the opposite ends of the gallery 22, the O-rings providing a seal against the outer periphery of the sleeve 24 to hermetically seal the gallery 22.

Various other combinations and modifications can be made without departing from the scope of the appended claims as will be apparent to persons skilled in the art.

We claim:

1. A hydraulically securable and angularly adjustable gear, for use in a drive to a printing cylinder or other member requiring precise positional angular adjustment, comprising in combination:

an annular body having an axial bore;

a toothed gear extending radially outward beyond said body, and secured directly to said body, said gear providing a concentric, radially outwardly extending extension of said annular body;

a gallery of larger diameter than said bore formed in said annular body and extending axially thereof, said gallery having one side open to said bore, and terminating at its axially opposite ends in radially inwardly extending lands;

a sleeve positioned within said bore and bridging said lands, said sleeve being secured to and hermetically sealed to said lands; and, having an internal diameter greater than that of a shaft with which said gear is associated;

hydraulic actuator means operative to pressurize said gallery with an incompressible hydraulic fluid; and, an hermetically closable bleed passage means connected to said gallery to permit air to be purged from said gallery;

whereby said gear and annular body can be slid onto a shaft of complementary diameter, adjusted axially and angularly relative to said shaft and locked to said shaft in any selected position of axial and angular adjustment relative to said shaft.

2. The gear of claim 1, in which said annular body provides a hub of said gear extending axially beyond said gear, said hydraulic actuator and said bleed passage each being located within said hub and each extending axially thereof.

3. The gear of claim 1, in which said annular body and said gear are formed integrally with each other, said annular body providing a hub of said gear extending axially beyond said gear, said hydraulic actuator being positioned within said gear and extending radially within said gear, and said bleed passage being positioned within said hub and extending axially within said hub.

4. The gear of claim 1, in which said annular body and said gear are formed integrally with each other, said hydraulic actuator and said bleed passage each extending radially within said gear and said annular body.

5. The gear of claim 1, in which said annular body is a cylindrical hub adapted to rigidly support and positively secure said gear, said gear having an axial bore of a diameter at least equal to the diameter of said axial bore of said annular body.

6. The gear of claim 1, in which said sleeve is secured to and hermetically sealed to said lands at its respective opposite ends by means of at least one of brazing, soldering, and adhesion of said sleeve to said lands.

7. The gear of claim 1, in which said sleeve is secured to said lands at its respective opposite ends, and is hermetically sealed by O-rings contained within grooves in the respective said lands.

* * * * *